United States Patent [19]
Nguyenphu et al.

[11] Patent Number: 4,961,162
[45] Date of Patent: Oct. 2, 1990

[54] MULTIPROCESSING SYSTEM FOR PERFORMING FLOATING POINT ARITHMETIC OPERATIONS

[75] Inventors: Myhong Nguyenphu; Larry E. Thatcher, both of Austin, Tex.

[73] Assignee: International Business Machines Corporation, Armonk, N.Y.

[21] Appl. No.: 297,782

[22] Filed: Jan. 13, 1989

[51] Int. Cl.⁵ .............................................. G06F 7/38
[52] U.S. Cl. ..................................... 364/748; 364/736
[58] Field of Search ....................... 364/748, 736, 704

[56] References Cited

U.S. PATENT DOCUMENTS

| | | | |
|---|---|---|---|
| 4,217,657 | 8/1980 | Handly et al. | 364/748 |
| 4,413,326 | 11/1983 | Wilson et al. | 364/748 |
| 4,612,628 | 9/1986 | Beauchamp et al. | 364/748 |
| 4,620,292 | 10/1986 | Hagiwara et al. | 364/748 |
| 4,748,580 | 5/1988 | Ashton et al. | 364/748 |
| 4,796,218 | 1/1989 | Tanaka et al. | 364/748 |

OTHER PUBLICATIONS

*IBM Technical Disclosure Bulletin*, vol. 26, No. 12, May 1984, pp. 6473–6475, entitled "Memory Transfer at Arbitrary Byte Boundaries".
*IBM Technical Disclosure Bulletin*, vol. 27, No. 1A, Jun. 1984, pp. 95–100, entitled "Dynamic Boundary Algorithm for a Data Movement Mechanism".
*IBM Technical Disclosure Bulletin*, vol. 27, No. 3, Aug. 1984, pp. 1585–1587, entitled "Storage Write Operation Control".
*IBM Technical Disclosure Bulletin*, vol. 24, No. 11B, Apr. 1982, pp. 5948–5950, entitled "Odd-Byte Data Alignment Mechanism for System I/O".

*Primary Examiner*—David H. Malzahn
*Attorney, Agent, or Firm*—Thomas E. Tyson

[57] ABSTRACT

A data processing system including a first processor that performs fixed point arithmetic operations and a second processor that performs floating point arithmetic operations. These two processors are connected by control circuitry that decodes a floating point arithmetic instruction that requires the second processor to perform a specified floating point arithmetic operation. The control circuitry provides information to the first processor to enable the first processor to compute a memory address for accessing the floating point data required by the second processor for performing the specified floating point arithmetic operation. Simultaneously the control circuitry provides the second processor with the information to initiate the execution of the specified floating point arithmetic operation. Also, the data processing system includes the means to access multi-word floating point data on either even or odd memory address boundaries.

12 Claims, 13 Drawing Sheets

MULTIPROCESSING SYSTEM FOR PERFORMING FLOATING POINT ARITHMETIC OPERATIONS

RELATED CASES

This patent application is related to U.S. patent application Ser. No. 07/297,783, filed Jan. 13, 1989 entitled "Tightly Coupled Multiprocessor Instruction Synchronization", U.S. patent application Ser. No. 07/297,781, filed Jan. 13, 1989 entitled "Floating Point Arthmetic Two Cycle Data Flow", and U.S. patent application Ser. No. 07/297,771, filed Jan. 13, 1989 entitled "A Method and Apparatus for Performing Floating Point Division".

FIELD OF THE INVENTION

This invention relates to data processing systems and more specifically to data processing systems using a multiple of processors to execute floating point arithmetic operations.

BACKGROUND ART

Traditionally floating point operations have been performed by a floating point processor. In some systems, such as the IBM RT workstation, the floating point processor functions as a peripheral unit relative to the central processing unit. The operation of this external floating point processor is not closely synchronized with the operation of the central processing unit.

Floating point operations often require data that consists of a multiple of data words. Normally, the use of interleaved memory requires that data words be accessed starting at even addresses. This enables the even and odd words to be transmitted by some systems in parallel. Therefore, the loading and storing of floating point data requires that the data be stored on even memory address boundaries. When floating point arithmetic data has been stored on odd memory address boundaries, a system interrupt has been traditionally generated so that the system software can compensate for the misalignment of the floating point arithmetic data to enable the floating point processor to perform the specified floating point operation.

Examples of the prior art that address misaligned data include IBM *Technical Disclosure Bulletin*, Vol. 26, No. 12, May, 1984, pages 6473-6475, entitled "Memory Transfer at Arbitrary Byte Boundaries" which discloses a mechanism for reordering data bytes for transfer. IBM *Technical Disclosure Bulletin*, Vol. 27, No. 1A, June, 1984, pages 95-100, entitled "Dynamic Boundary Algorithm for a Data Movement Mechanism" discloses an algorithm to transfer data in groups having links specified by the address boundaries. IBM *Technical Disclosure Bulletin*, Vol. 27, No. 3, August, 1984, pages 1585-1587, entitled "Storage Write Operation Control" discloses the performance of a storage write operation when different write capacities are provided, i.e., full word, half word, and character transfers with odd or even alignment. IBM *Technical Disclosure Bulletin*, Vol. 24, No. 11B, April, 1982, pages 5948-5950, entitled "Odd-Byte Data Alignment Mechanism for System I/O" discloses an apparatus for achieving odd-byte data alignment mechanism for an I/O device.

It is the object of the present invention to provide a multiprocessing system for performing floating point operations. It is a further object of the present invention to provide a multiprocessing system for performing floating point operations wherein data stored for the floating point operations consist of multiple words and can be stored on either even or odd memory address boundaries.

SUMMARY OF THE INVENTION

In accordance with the present invention a data processing system is provided that consists of a first processor that performs a fixed point arithmetic operation and a second processor that performs floating point arithmetic operations. A control circuit is connected to the first processor and the second processor for decoding a floating point arithmetic instruction that requires the second processor to perform a specified floating point arithmetic operation. The control circuitry provides information to the first processor to enable the first processor to compute the memory address for the floating point data required for the second processor floating point operation while providing the floating point operation information to the second processor for the execution of the specified floating point arithmetic operation.

In the preferred embodiment the first and second processors are connected by the control circuitry to enable the first processor to address floating point data in a memory for the second processor. This floating point data consists of a multiple of data words. According to the teachings of the invention the first of the data words stored in the memory can either be in an even or odd address location in memory. The control circuitry includes capability for determining whether an even or an odd address has been accessed for the first data word and for providing the proper storage of the data words in the second processor floating point registers.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

BEST MODE FOR CARRYING OUT THE INVENTION

Figure 1:
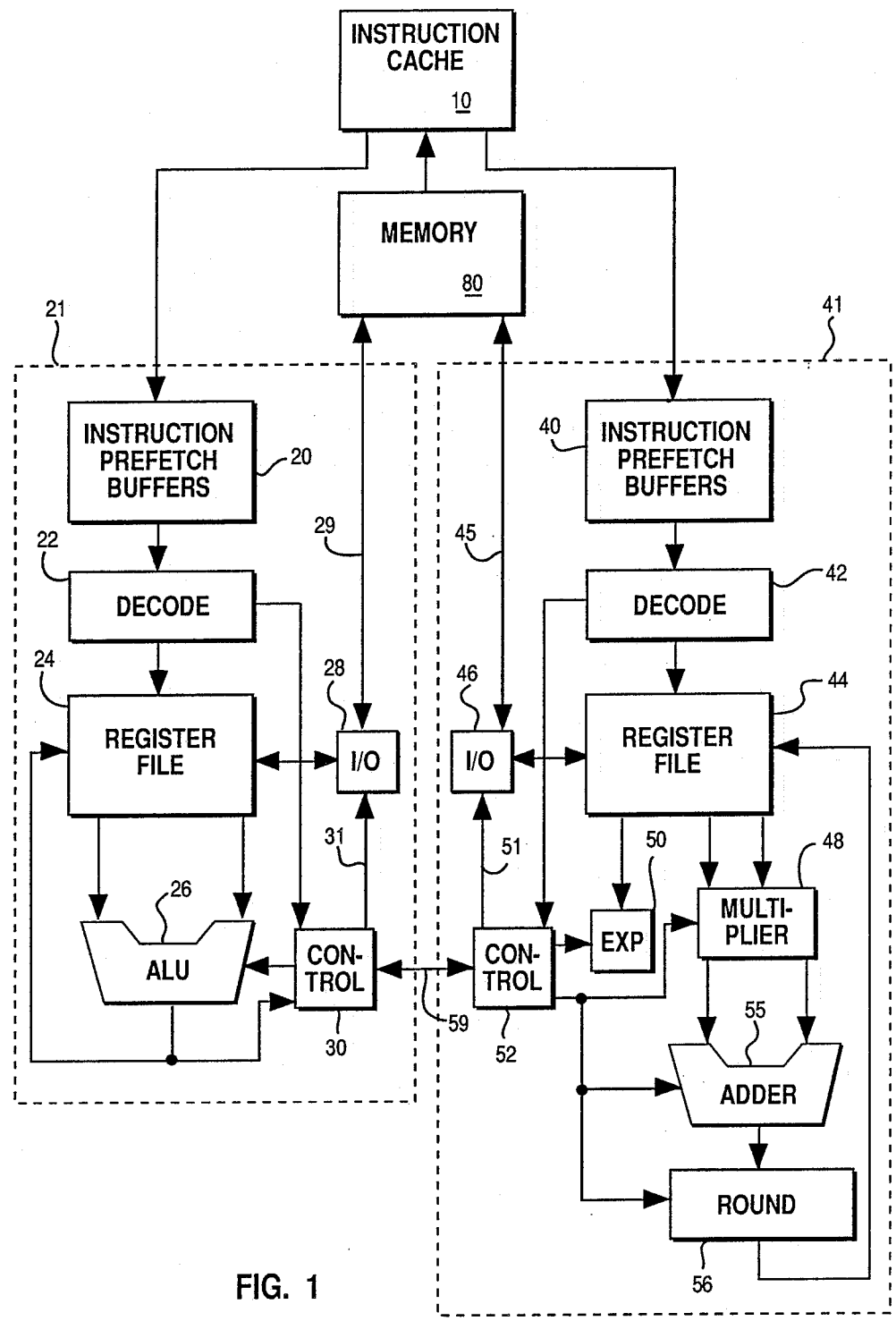
FIG. 1 is a block diagram of the multiprocessing system.

FIG. 1 is a block diagram illustrating the interconnection of a fixed point processor 21 to a floating point processor 41. Both the fixed point processor 21 and the floating point processor 41 are connected to an instruction cache 10 and memory 80. Also the fixed point processor 21 is connected to the floating point processor 41 through control lines 59. Specifically the fixed point processor 21 control circuitry 30 is connected to the floating point processor 41 control circuitry 52 via lines 59. The fixed point processor consists of an instruction prefetch buffer 20 connected to the instruction cache 10. Instructions from the instruction prefetch buffer 20 are decoded in decoding circuitry 22. Data from the decoding circuitry 22 is provided to the register file 24. Also decoding information from the decoding circuitry 22 is provided to the control circuitry 30. The register file 24 is connected to the arithmetic logic unit (ALU) 26 and the I/O (input/output) circuitry 28. The I/O circuitry 28 is connected via line 29 to the memory 80. This I/O circuitry 28 is also connected to the register file 24 and to the control circuitry 30. The arithmetic logic unit is further connected to the control circuitry 30 and back to the register file 24 as shown.

The floating point arithmetic processor 41 also consists of an instruction prefetch buffer 40 that is connected to a decode circuitry 42. The decode circuitry 42 is in turn connected to the control circuitry 52 and the register file 44. The register file 44 is connected to the I/O circuitry 46, the exponential circuitry 50, and a multiplier 48. The multiplier 48 is connected to an adder 55. The adder 55 is in turn connected to a rounding circuit 56. The control circuitry 52 is also connected to the multiplier 48, the adder 55, the rounding circuit 56 and I/O circuitry 46. Also the I/O circuitry 46 is connected to the memory 80 via line 45 and the register file 44. In operation, a floating point instruction that is stored in the instruction cache 10 is transferred to both the instruction prefetch buffer 20 in the fixed point processor 21 and the instruction prefetch buffer 40 in the floating point processor 41. In operation, the floating point instruction requires the fixed point processor 21 to calculate the address during the time that the floating point processor 41 initializes execution of the floating point instruction operation. The synchronization of the fixed point processor 21 and the floating point processor 41 is accomplished by the two control units 30 and 52 communicating over lines 59. The specific floating point arithmetic operation performed is a floating point load from memory or floating point store to memory operation. Floating point data include a multiple of data words. In the preferred embodiment, a floating point data word consists of at least two data words.

Figure 2:
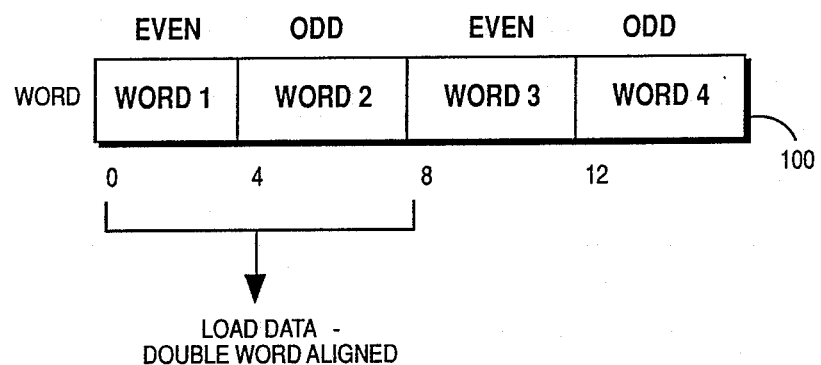
FIG. 2 is a diagram illustrating the loading of two words in memory on an even memory address boundary.
Figure 3:
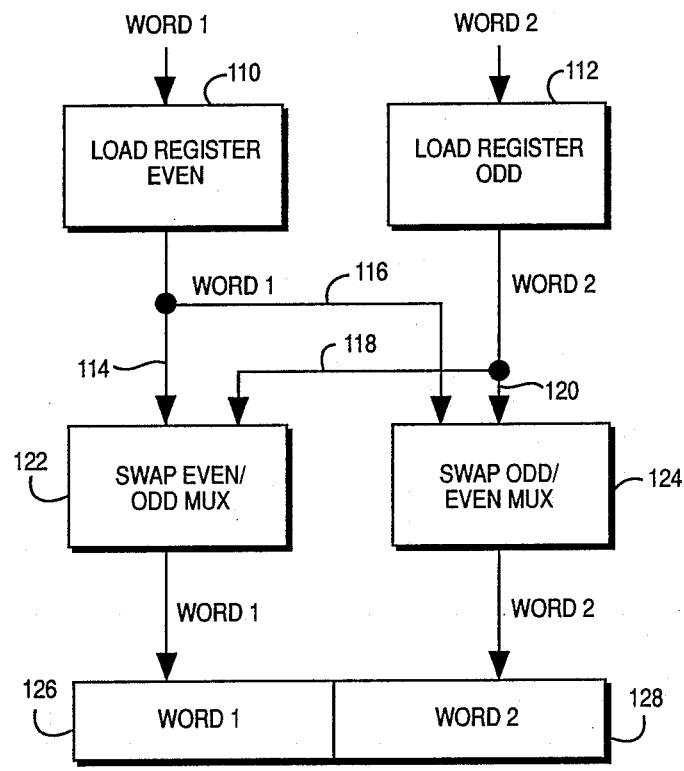
FIG. 3 is a block diagram illustrating the connection of the two floating point processor registers to the two word data buses.

FIG. 2 illustrates the storage of floating point data consisting of two data words. In FIG. 2 WORD 1 is stored on an even memory address boundary and WORD 2 is stored on an odd memory address boundary. The term address boundary relates to the value of the address itself. In other words, an even address boundary means that the memory address is an even number. Likewise, an odd address boundary means that the memory address is an odd number. The two word floating point data of FIG. 2 is referred to as double word aligned data. The storage of the two words (WORD 1 and WORD 2) is illustrated in FIG. 3. In FIG. 3 a load register 110 is provided for the loading of the even word and register 112 is provided for the odd word. Multiplexers 122 and 124 are provided to switch the locations of the data stored in registers 110 and 112 if required. However, in this example, the double word data is aligned. Therefore, no changing of positions is required. The data from register 110 will be loaded through multiplexer 122 into register location 126. Likewise the data in register 112 will be loaded through multiplexer 124 into register 128. Registers 126 and 128 are the actual floating point processor unit internal registers.

Figure 4:
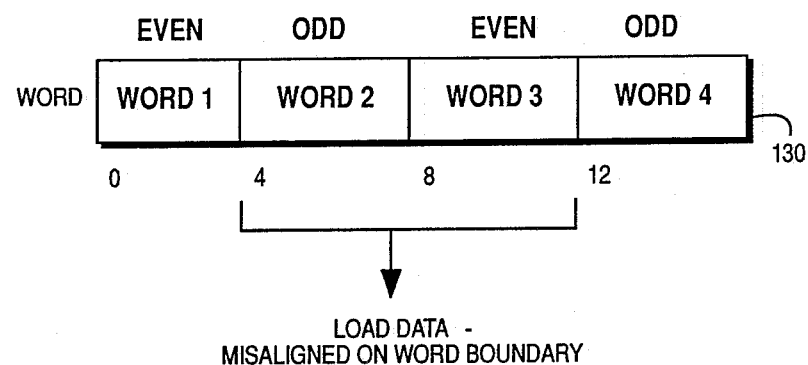
FIG. 4 is a diagram illustrating the loading of two data words on misaligned or odd memory address boundaries.
Figure 5:
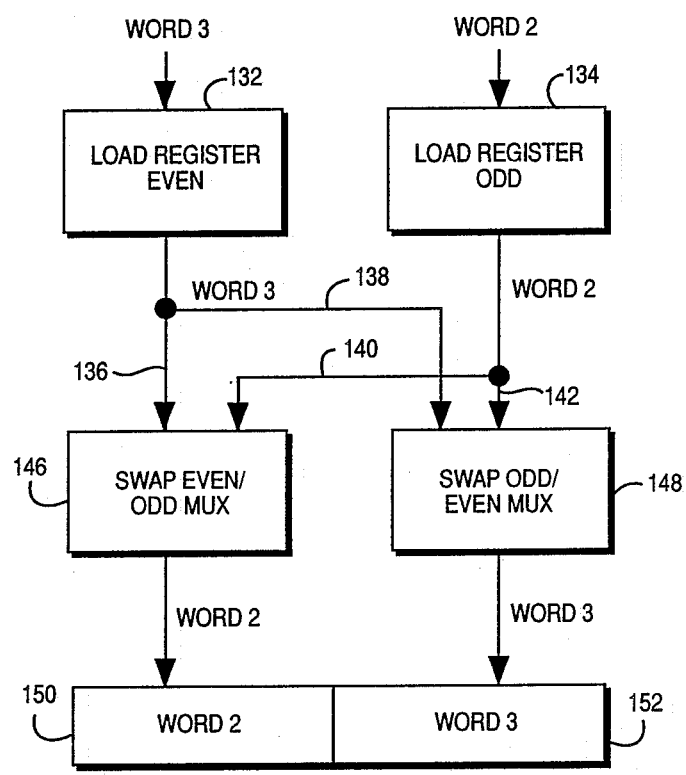
FIG. 5 is a block diagram illustrating the connection of the floating point arithmetic registers to the two word data buses.

FIG. 4 illustrates the storage of a floating point double word on misaligned or odd word boundaries. In other words, in FIG. 4, the first word of the data (WORD 2) is stored on an odd boundary and the second word (WORD 3) is stored on an even boundary. In FIG. 5, WORD 3 is loaded into register 132 and WORD 2 is loaded into register 134. The contents of register 132 must be loaded into the floating point register 152. Likewise the contents of register 134 must be loaded into floating point register 150. This is accomplished by the multiplexers 146 and 148. Multiplexer 146 is connected to both register 132 and 134. Likewise, multiplexer 148 is connected to register 132 via lines 136 and 138. Therefore, under the control of control circuitry 30 and control circuitry 52, the multiplexers are configured such that the data from register 134 is loaded into register 150 and the data from register 132 is loaded into register 152.

Figure 6:
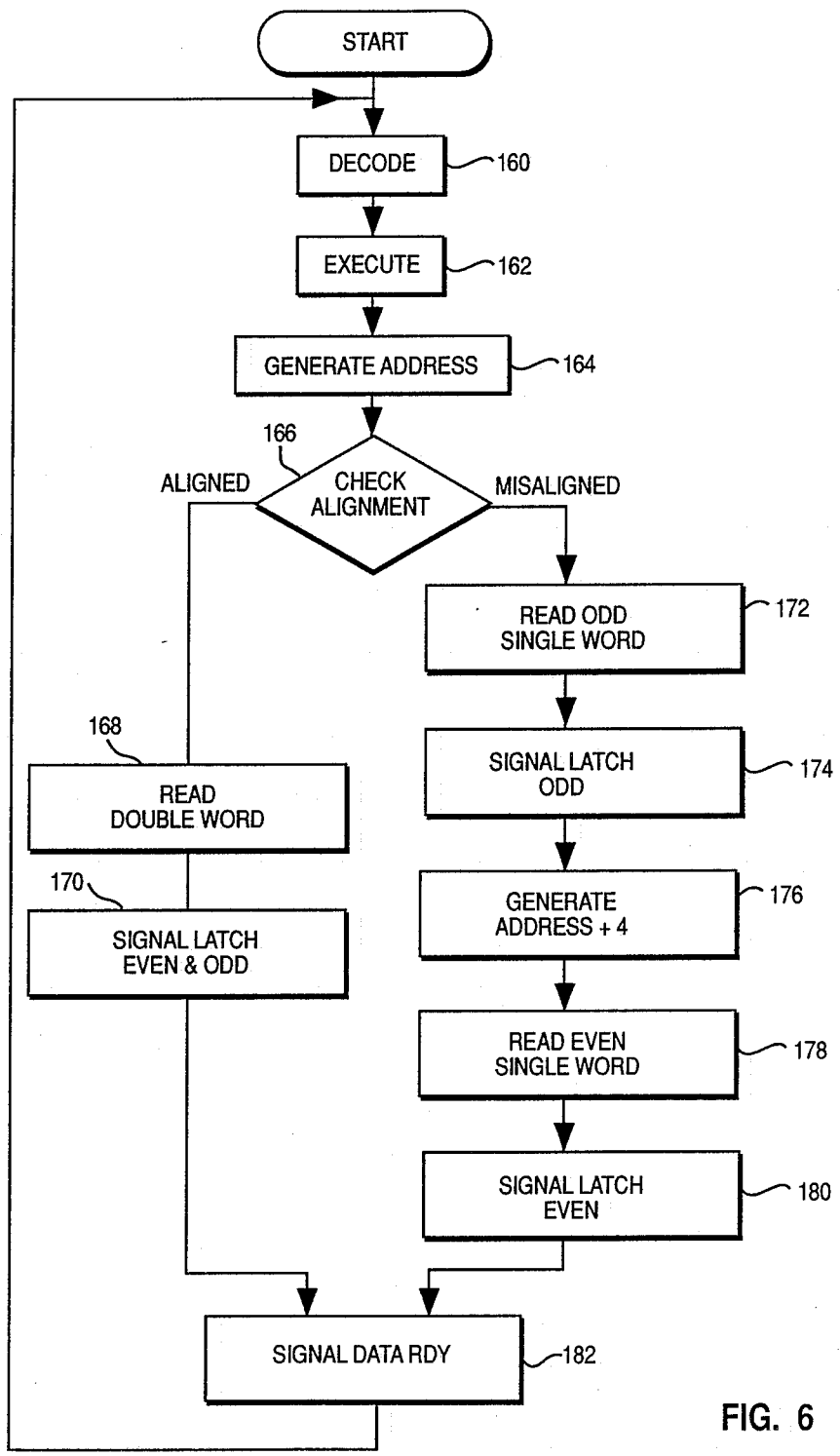
FIG. 6 is a flow chart illustrating the control flow for the fixed point processor during a floating point load operation.

FIG. 6 illustrates the control flow of the control circuitry 30 in performing the address generation for a floating point load instruction. In step 160 the instruction received from the instruction cache 10 through the instruction prefetch buffer 20 is decoded in decoding circuitry 22. In step 162 the operation that is required from the decoded instruction is then executed. In step 164 the actual address is generated. In step 166 the control circuitry 30 checks the alignment of the generated address to determine if the address boundary is even and then aligned or odd and then misaligned. If the alignment is even, the control proceeds to step 168 to read the double word from memory and then to step 170 to provide the signal to the load register latches 132 and 134 (FIG. 5) or registers 110 and 112 (FIG. 3) to load its respective words from the memory. Then, the control proceeds to step 182 to signal the floating point processor that the data is ready. This signal is provided over one of lines 59. If the address generated is misaligned, i.e., the generated address is an odd address, the control proceeds to step 172 to read a single word from the odd address. Then in step 174, the odd latch (latch 134 in FIG. 5 for example) is signaled to receive the word. The even address is then generated in step 176. In step 178 the even addressed word is then read. In step 180 the even register (register 132 in FIG. 5 for example) is signaled to receive the even addressed word. The control then proceeds to step 182 as before. Upon completion of signalling that the data is ready the control flow returns to the beginning of step 160.

Figure 7:
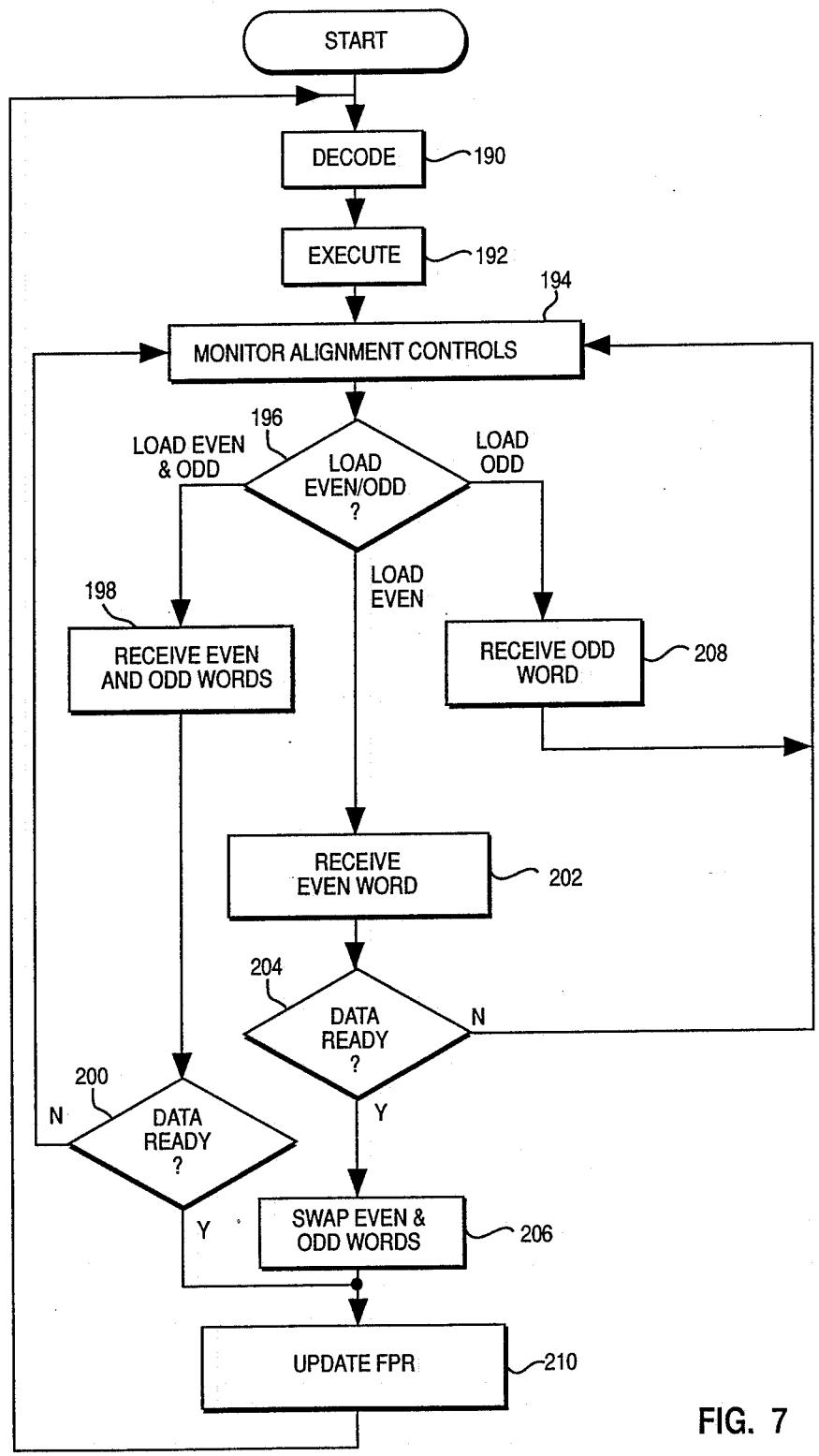
FIG. 7 is a flow chart illustrating the control flow for the floating point processor during a floating point load operation.

FIG. 7 illustrates the control flow for the control circuitry 52 in the floating point arithmetic processor 41. In step 190 the instruction is decoded. Like the fixed point processor 21 the instruction for the floating point processor 41 originates from the instruction cache 10 through the instruction prefetch buffer 40 to the decoding circuitry 42. In step 192 the instruction operation dictated by the floating point instruction is executed. In step 194 the control circuitry 52 monitors the alignment control signals on line 59 from the control circuitry 30 of the fixed point processor 21. This monitoring determines whether or not the address that is being loaded begins at an even or an odd address. This decision is determined in 196 and if the load starts on an even address both the even and odd addressed words are loaded and received in step 198. Upon exiting step 198, the control determines in step 200 whether or not the data is then ready. If not, the control returns to step 194. If the data is ready, the control proceeds to step 210. Returning to step 196, if a load even signal is received from the control circuitry 30, the control proceeds to step 202 to receive the word on the even address. In step 204, the control determines whether the data is ready. If not, the control returns to step 194. If the data is ready, the control proceeds to step 206 to swap the even and odd words by using the multiplexers described in FIGS. 3 and 5. In step 196, after the decision has been made to receive the odd word, the odd word is received in step 208. In step 196 where an odd word is to be loaded first, the odd word is received first in step 208 before the even word is received in step 202. Therefore the data in the odd and even registers (132 and 134 of FIG. 5 for example) are ready to be swapped. In step 210, the control circuitry 52 updates the registers in the floating point register file 44. The control then returns to step 190 to determine the next instruction.

Figure 8:
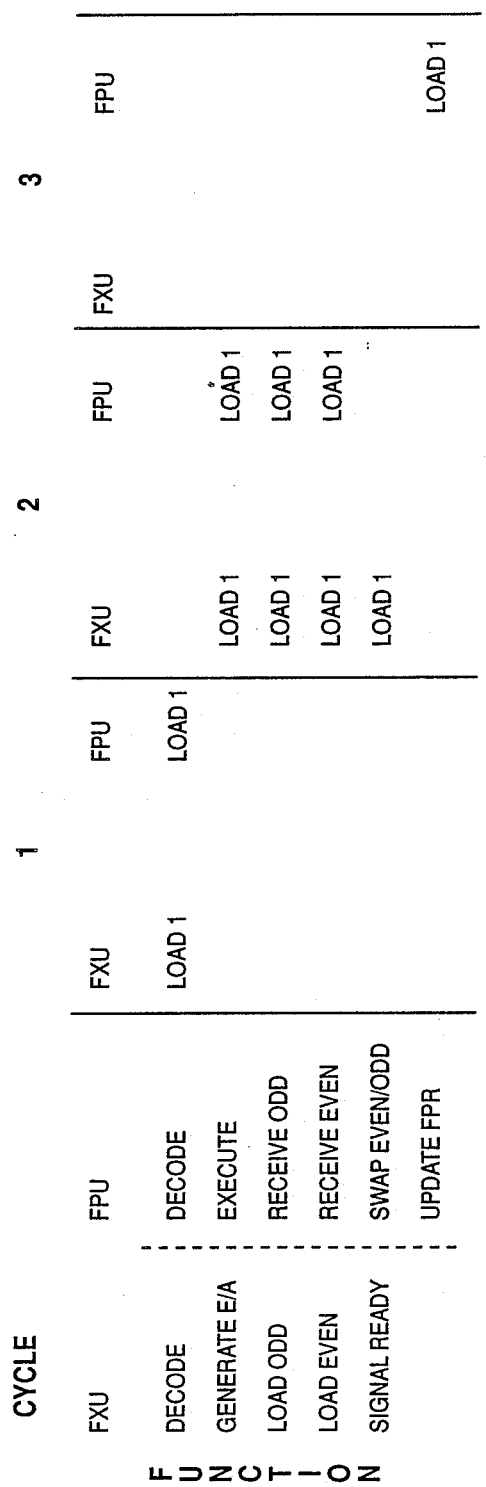
FIG. 8 is a timing diagram illustrating the pipeline operations of the fixed point and floating point processors executing a load operation on an even memory address boundary.

FIG. 8 is a timing diagram illustrating the pipelined operation of the fixed point processor 21 (FXU) and the floating point processor 41 (FPU). Specifically the operation in FIG. 8 is for an aligned access of data words. In cycle 1 the instruction (LOAD 1) is decoded by both the fixed point processor and the floating point processor. In cycle 2 the LOAD 1 instruction is used by the fixed point processor to generate the effective address and the odd and even words are loaded as shown. Also in cycle 2, the fixed point processor provides the ready signal. In cycle 2 the floating point processor receives the odd and even words together with executing the LOAD 1 instruction. In cycle 3, the floating point unit which updates the floating point registers accordingly with the received data.

Figure 9:
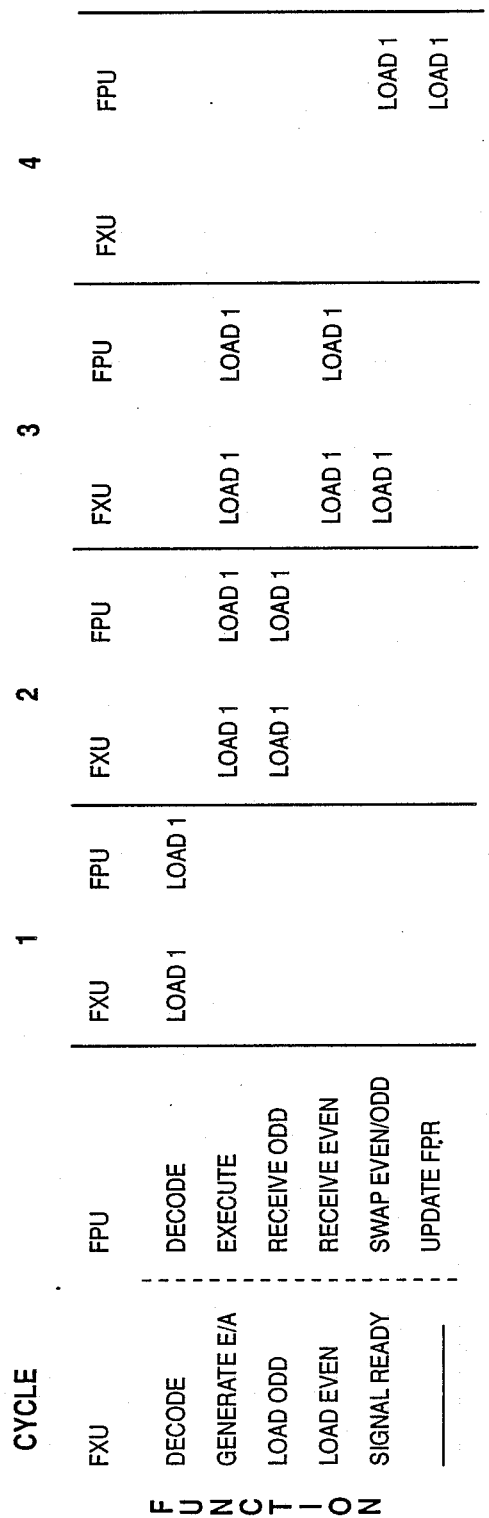
FIG. 9 is a timing diagram illustrating the pipeline operation of the fixed point and floating point processors executing an arithmetic load operation on an odd or misaligned memory address boundary.
Figure 10:
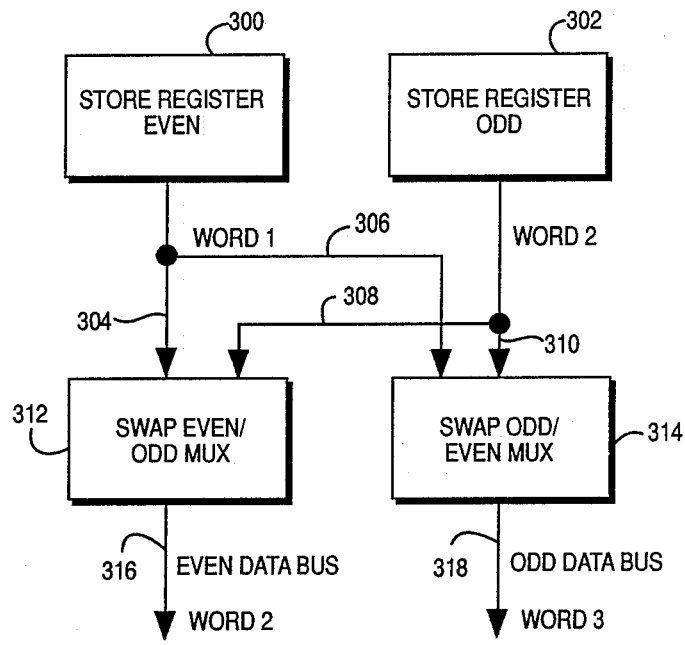
FIG. 10 is a block diagram illustrating the connection of the two floating point processor registers to the two word data buses.
Figure 11:
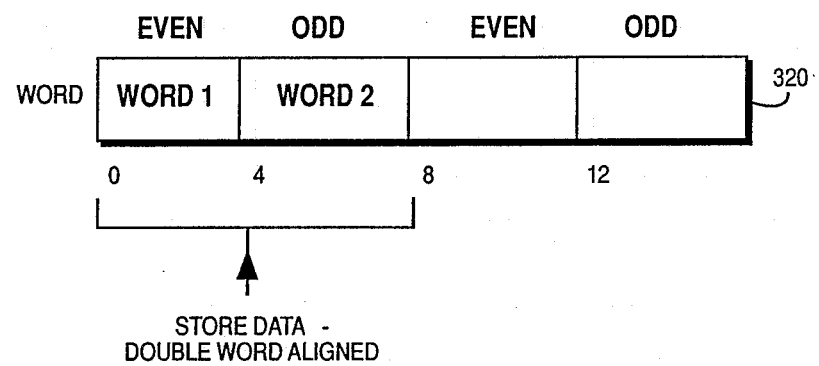
FIG. 11 is a diagram illustrating the storage of two words in memory on an even memory address boundary.
Figure 12:
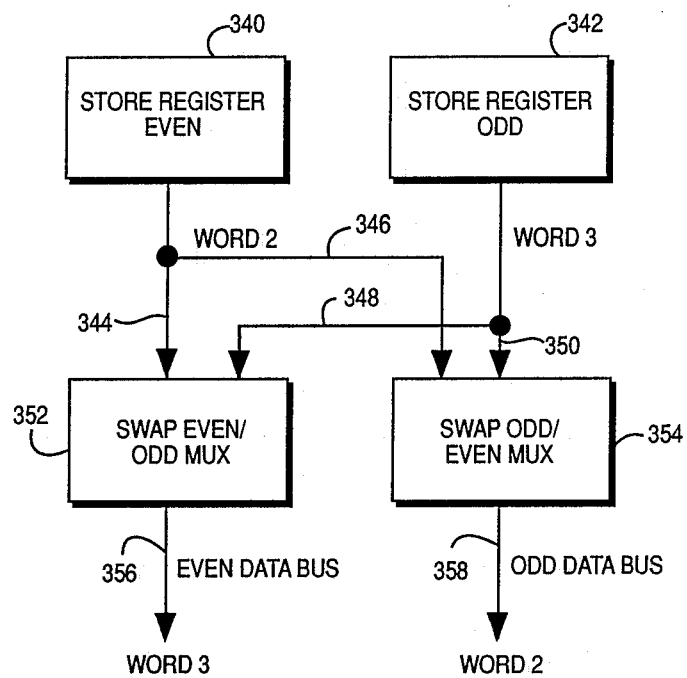
FIG. 12 is a block diagram illustrating the connection of the floating point arithmetic registers to the two word data buses.
Figure 13:
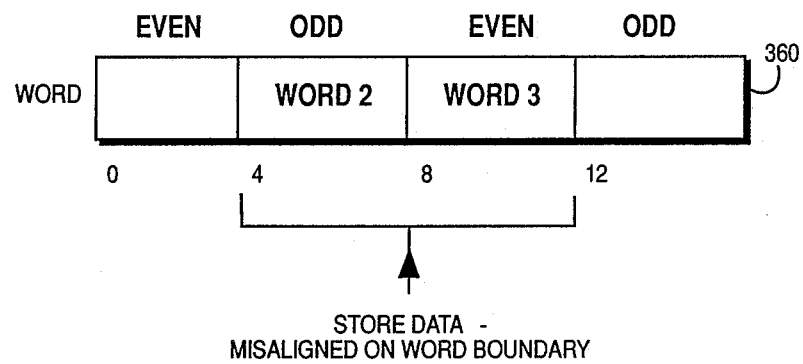
FIG. 13 is a diagram illustrating the storage of two data words on misaligned or odd memory address boundaries.
Figure 14:
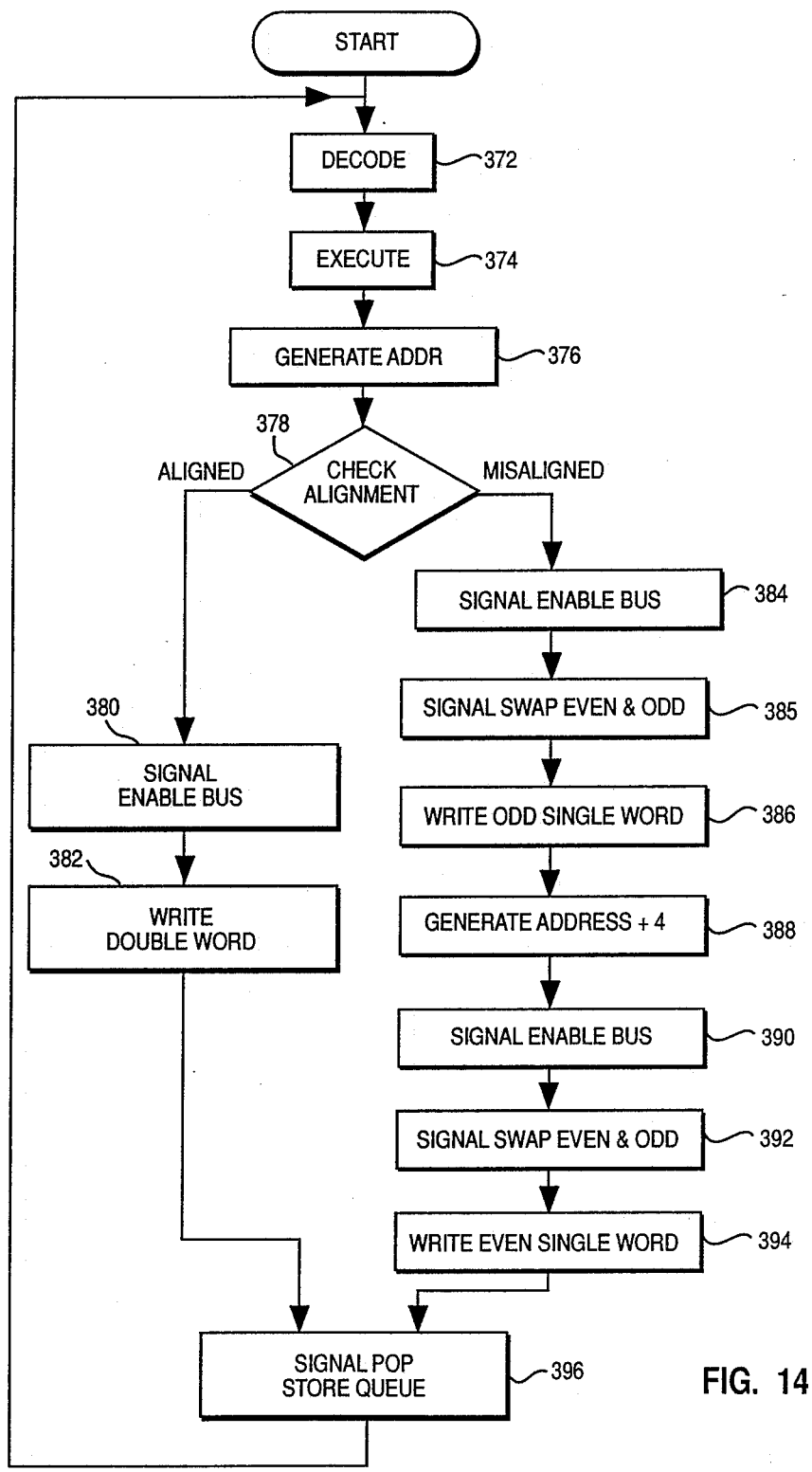
FIG. 14 is a flow chart illustrating the control of the fixed point unit during a floating point arithmetic store operation.
Figure 15:
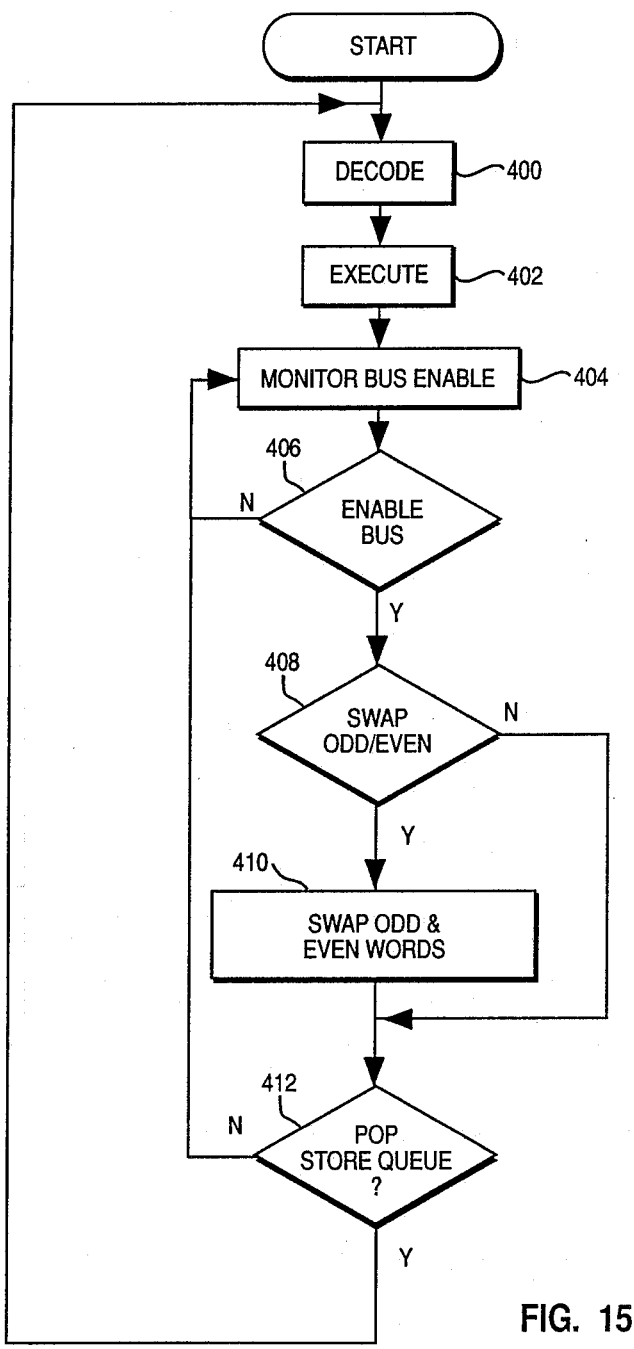
FIG. 15 is a flow chart illustrating the control flow the floating point processor during the performance of a floating point arithmetic store operation.

In FIG. 9, a load of misaligned data is illustrated (i.e., data starting on an odd address boundary). In cycle 1 the LOAD 1 instruction is decoded by both processors. In cycle 2 the address for the load is generated in fixed point unit and the odd word (the first word of the two word set) is fetched. In the floating point unit in cycle 2, the LOAD 1 instruction is initially executed and the odd word is received by the odd register (134 in FIG. 5). In cycle 3 the address for the even word is then generated and the floating point unit continues the execution of the instruction. Also in cycle 3 the even word is loaded from the fixed point unit and received by the floating point unit. The ready signal is provided in cycle 3 by the fixed point unit. In cycle 4, the floating point unit then performs the swap of the even and odd words into the appropriate floating point register file. The execution of a floating point arithmetic store operation is similar. In FIG. 10 the block diagram illustrates the storage of the even and odd words from the registers onto the even data bus and odd data bus 316 and 318 respectively. Note that multiplexers 312 and 314 are provided such that the word stored in register 300 can be loaded on either the even data bus 316 or the odd data bus 318. Likewise the contents of register 302 (the odd register) can be loaded on either of the data buses 316 and 318. The illustration in FIG. 11 shows the loading of an aligned word set having the first word (WORD 1) loaded in the even location and the second word loaded on the odd location. FIG. 12 is a block diagram illustrating the loading of WORDS 2 and 3 on odd and even boundary respectively. In operation the contents of the even register 340 is initially loaded through multiplexer 354 onto the odd data bus line 358 by means of bus 346. Afterwards the contents of the odd register 342 is loaded over line 348 through multiplexer 352 onto the even data bus 356. The resulting storage appears in FIG. 13 having the first word (WORD 2) stored on the odd boundary and the second word (WORD 3) stored on the even boundary as shown. The control flow for performing the floating point arithmetic store is illustrated in FIGS. 14 and 15. In FIG. 14, the control flow for the fixed point unit is illustrated. Initially, the instruction is decoded in step 372 and executed in step 374. The address is generated in step 376. In step 378 the alignment is determined. If the alignment is even, the control proceeds to step 380 to enable the memory bus and the double word is written in step 382 (i.e., both the odd and even buses are used to write the odd and even words respectively to memory). The control then proceeds to step 396 to signal completion. If a non-even alignment is to be performed, the control proceeds to step 384 to enable the bus. Next in step 385, the swap command is issued causing the even store register to be place on the odd bus to memory as shown in FIG. 12. Then in step 386 a write of the odd bus to memory is performed. In step 388 the even word address is generated. In step 390 again the bus is given the enable signal and in step 392 the odd store register is placed on the even data bus as previously discussed in FIG. 12. In step 394 the write of the even bus to memory is performed. The control continues to step 396 to signal completion.

In FIG. 15 the control flow in the floating point unit is illustrated. First the instruction is decoded in step 400 and then executed in step 402. Again the control lines 59 are monitored in step 404. In step 406 a determination is made as to whether the bus has been enabled. If not the control returns to step 404 to continue to monitor the bus. Once the bus has been enabled, the control flow proceeds to step 408 to determine if an odd/even swap is being signaled. If not, the control proceeds to step 412. If an odd/even swap is being signaled, the control flow proceeds to step 410 to signal the multiplexer (multiplexer 354 in FIG. 12 for example) to perform the swap. In step 412, the control determines if the completion signal has been received. If not, the control returns to step 404. If the completion signal has been received, the control flow proceeds back to the start of the process.

Figure 16:
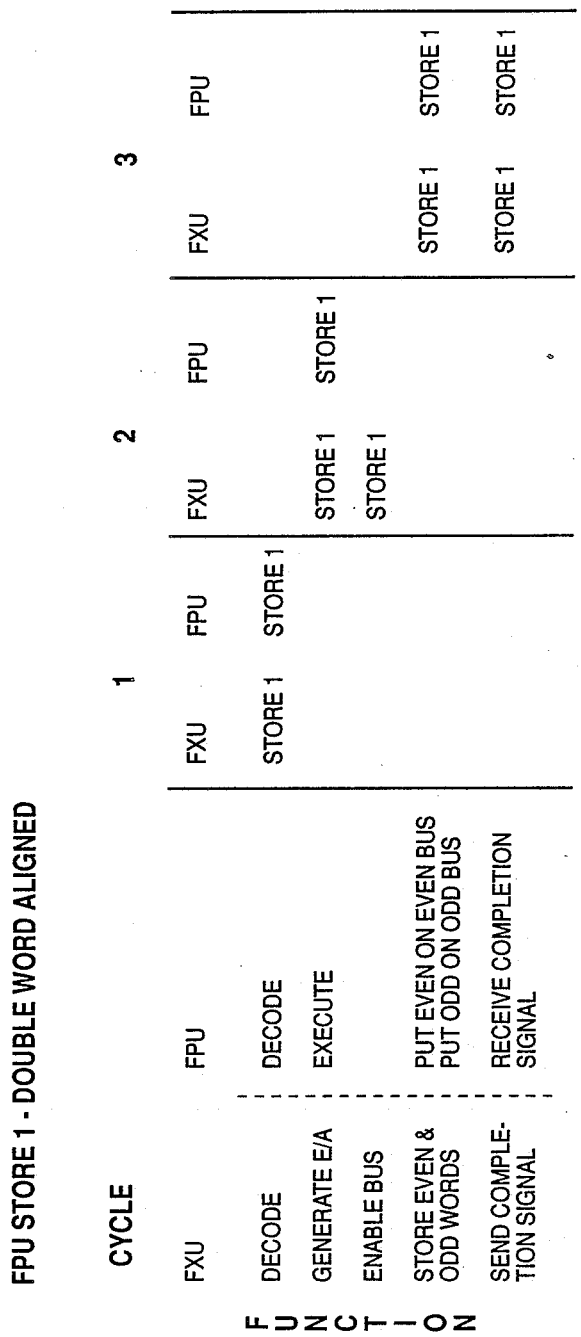
FIG. 16 is a timing diagram illustrating the pipeline operation of the fixed point processor and the floating processor during the execution of a floating point arithmetic store operation on a even word boundary.

FIG. 16 is a timing diagram illustrating the operation of the fixed point processor (FXU) and the floating point processor (FPU) in a pipelined fashion while executing a floating point arithmetic store operation on an even word boundary aligned. Initially in cycle 1, both the fixed point processor and floating point processor decode the store 1 instruction. In cycle 2 the fixed point processor generates the effective address enables the bus while the floating point processor initiates execution of the store 1 instruction. In cycle 3 the fixed point unit signals the storage of the even and odd words while the floating point unit in response to the signals places the even word on the even bus and odd word on the odd bus. Also, the completion signal is transferred.

Figure 17:
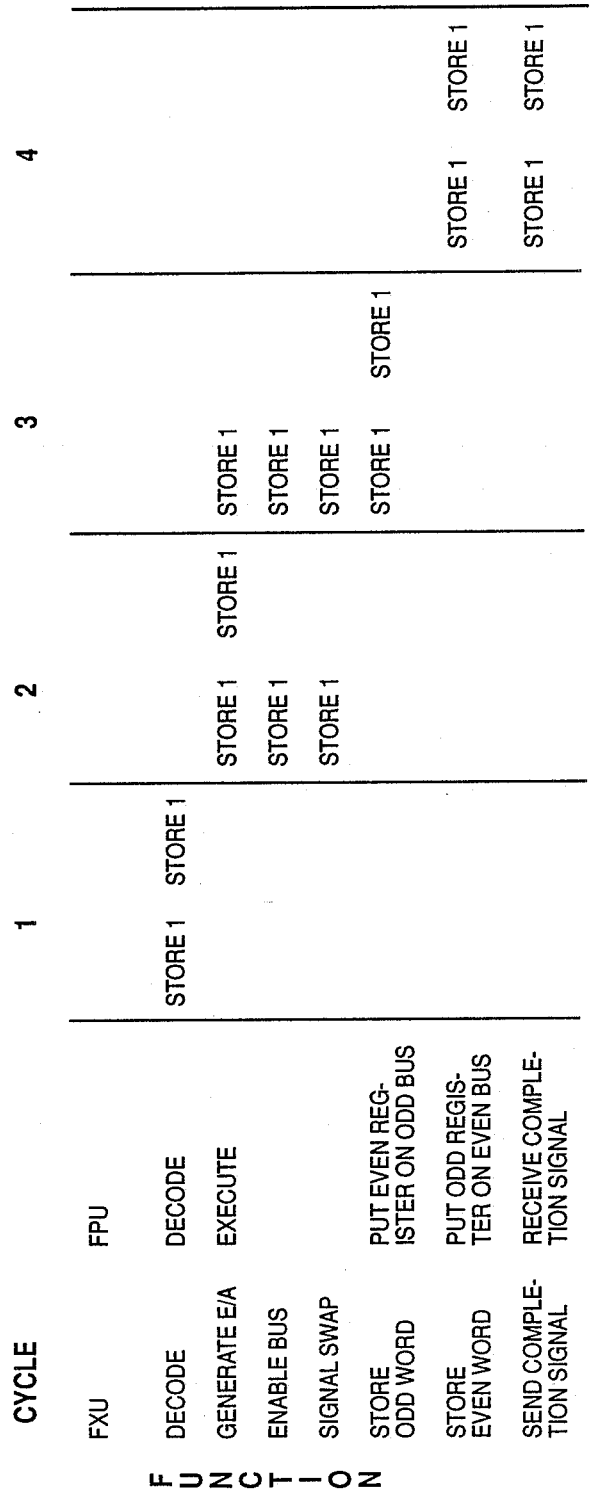
FIG. 17 is a timing diagram illustrating the pipeline operation of the fixed point processor and the floating point processor during the floating point arithmetic store operation on odd or misaligned memory address boundaries.

FIG. 17 is a timing diagram illustrating the operation of the fixed point processor and the floating point processor for an arithmetic store operation on an odd boundary (i.e., a non-even alignment or misalignment). In cycle 1 the store 1 instruction is decoded by both processors. In cycle 2 the fixed point processor generates the odd effective address and enables the bus while the floating point processor initiates execution. The fixed point unit issues a swap command to swap even-/odd register connections to the even/odd buses. In cycle 3 the fixed point unit generates the effective address for the even data word, enables the bus again, issues a swap command and actually stores the odd bus. The floating point unit in response to the fixed point unit stores the odd word in the even register on the odd bus. In cycle 4 the even word storage is indicated by the fixed point unit and the even word in the odd register is placed on the even bus by the floating point unit. Then the fixed point unit signals the operation completion and the floating point unit receives this completion signal.

In this invention, either even or odd alignment is executed avoiding the requirement of a software interrupt to "fix" alignment. This feature results in a higher performance in the speed of execution of floating point operations.

Although the invention has been described with reference to this specific embodiment, this description is not meant to be construed in a limiting sense. Various modifications of the disclosed embodiment, as well as other embodiments of the invention, will become apparent to those persons skilled in the art upon reference to the description of this invention. It is, therefore, contemplated that the appended claims will cover any such modifications or embodiments as may fall within the true scope of the invention.

We claim:

1. A data processing system comprising:

a fixed point arithmetic processor means for performing fixed point arithmetic operations and including control means for decoding a floating point arithmetic instruction specifying a floating point arithmetic operation, and an addressing means for computing addresses for floating point data for said floating point operation from a memory means;

said memory means for storing data and including means for receiving said addresses from said fixed point arithmetic processor means and providing said floating point data to a floating point arithmetic processor means; and said floating point arithmetic processor means for performing floating point arithmetic operations and including control means for decoding the floating point instruction and performing said specified floating point arithmetic operation upon said floating point data from the memory means.

2. A data processing system according to claim 1 wherein said fixed point arithmetic processor means includes means for providing said computed memory addresses for said floating point data to said memory means.

3. A data processing system according to claim 2, wherein said floating point data includes a plurality of data words.

4. A data processing system according to claim 3 wherein said floating point data includes a first data word of said plurality of data words stored in either an even or an odd address location of said memory means.

5. A data processing system according to claim 4 further including a data bus connecting said fixed point arithmetic processor means, said floating point arithmetic processor means and said memory means and wherein said data bus includes an even data bus line for transferring data from even memory addresses and an odd data bus line for transferring data from odd memory addresses.

6. A data processing system according to claim 5 wherein said floating point arithmetic processor means includes a plurality of floating point registers and a loading means connected to said even data bus line, said odd data bus line for providing said first of said plurality of floating point data words to a first floating point register in said floating point arithmetic processor means and a second of said plurality of said floating point data words to a second floating point register of said floating point arithmetic processor means.

7. A data processing system according to claim 6 wherein said floating point arithmetic processor means loading means includes a first multiplexor means for loading a data word from either said odd data bus line or said even data bus line into said first floating point register.

8. A data processing system according to claim 7 wherein said floating point arithmetic processor means loading means includes a second multiplexor means for loading a data word from either said odd data bus line or said even data bus line into said second floating point register.

9. A data processing system according to claim 8 wherein said floating point arithmetic processor means first multiplexor means includes means for loading data from said first floating point register on to either said even data bus line or said odd data bus line as specified by said floating point arithmetic processor control means.

10. A data processing system according to claim 9 wherein said floating point arithmetic processor means second multiplexor means includes means for loading data from said second floating point register on to either said even data bus line or said odd data bus line as specified by said floating point arithmetic processor control means.

11. A data processing system comprising:
- a fixed point arithmetic processor including control means for decoding a floating point arithmetic instruction specifying a floating point arithmetic operation, and an addressing means for computing addresses for floating point data for said floating point operation from a memory;
- said memory including means for receiving said addresses from said fixed point arithmetic processor and providing said floating point data to a floating point arithmetic processor; and
- said floating point arithmetic processor including control means for decoding the floating point instruction and performing said specified floating point arithmetic operation upon said floating point data from the memory.

12. In a data processing system, a method of performing a floating point arithmetic operation comprising the steps of:
- decoding a floating point arithmetic instruction specifying said floating point arithmetic operation in a fixed point processor;
- computing, in said fixed point processor, addresses for floating point data for said floating point operation;
- fetching from a memory said floating point data at said addresses and providing the floating point data to a floating point processor;
- decoding the floating point arithmetic instruction specifying said floating point arithmetic operation in said floating point processor; and
- executing the floating point arithmetic operation in the floating point processor when the floating point data has been received by the floating point arithmetic processor.

* * * * *